March 25, 1969     E. O. FORSTER     3,434,220

MICROWAVE DRYING PROCESS FOR SYNTHETIC POLYMERS

Filed Oct. 10, 1967

E. O. Forster INVENTOR

BY Jack Matalon

PATENT ATTORNEY

United States Patent Office 3,434,220
Patented Mar. 25, 1969

3,434,220
MICROWAVE DRYING PROCESS FOR
SYNTHETIC POLYMERS
Eric O. Forster, Scotch Plains, N.J., assignor to Esso
Research and Engineering Company, a corporation of
Delaware
Filed Oct. 10, 1967, Ser. No. 674,155
Int. Cl. F26b 3/34
U.S. Cl. 34—1                                          14 Claims

ABSTRACT OF THE DISCLOSURE

Volatile polar vehicles such as water or organic solvents, are removed from essentially nonpolar synthetic polymers by passing the polymer through a first resonating cavity operating at a microwave frequency of 915 mHz. for a time sufficient to reduce the volatiles content to about 5 wt. percent and subsequently passing the partially dried polymer through a second resonating cavity operating at a microwave frequency of 2450 mHz. for a time sufficient to reduce the polar vehicle content to below 10 p.p.m., e.g. less than 1 p.p.m.

BACKGROUND OF INVENTION

This invention relates to improved polymer processes. More specifically, it relates to improved devolatilizing and drying techniques utilizing microwave heating.

In conventional processes for making polymers, it is necessary to remove solvents and/or water from the polymer. For example, in the preparation of butyl rubber, a multiolefin and an isoolefin are reacted at a temperature of about $-40°$ F. to about $-160°$ F. in the presence of a Friedel-Crafts catalyst such as aluminum chloride. The catalyst is ordinarily aluminum chloride in methyl chloride and the mixture of monomers, e.g. isoprene and isobutylene, contacts the catalytic solution in a tubular type of reactor at the low temperature conditions to form a slurry of butyl rubber particles in solution in a diluent which may also be methyl chloride. The slurry is then introduced into water to form a slurry of butyl rubber, generally in the form of crumbs, in the water. The rubber crumb is then removed from the slurry and dewatered on a vibrating screen or Oliver type rotary filter to about 30 to about 60% water by weight. It is further mechanically dewatered, e.g. Anderson Expeller or dewatering extruder, to a water content of about 6 to about 20 wt. percent.

An Anderson Expeller is a continuous mechanical screw press employing discontinuous worms on a shaft separated at intervals by collars and breaker lugs and operating within and through a barrel made up of bars separated by thin spaces. The shaft moves the material from the hopper, through the drainage barrel. As the solids move through the barrel under pressure, the liquid is pressed from the solids and permitted to escape through spaces between the bars that make up the barrel.

Thereafter, the remaining water is removed by heating. For example, the crumb is fed into a heated devolatilizing extruder equipped with a die face pelletizer. The pellets so formed are substantially free, i.e. 0.1 to 0.5 wt. percent of water. They are then dropped into water to cool to prevent agglomeration of the pellets. The surface water is removed by heating in a drying tunnel. The pellets are then cooled and baled, under pressure, in the manner described in U.S. Patent 3,264,387 which is incorporated herein by reference.

The baling process is generally performed at a temperature of about 140° F. to about 250° F. and a pressure of about 800 to about 3500 p.s.i.; the heat and pressure being maintained for about 5 to about 60 seconds. The resulting compacted mass has a density of about 40 to about 54 pounds per cubic foot.

Similar processes incorporating water separation and drying steps are inherent in other polymer processes. For example, styrene butadiene (GR-S) rubber is prepared as a rubber latex which is coagulated by the addition of acid or salts. The coagulated product is washed, filtered on an Oliver rotary vacuum drum filter, from which it is removed, having a water content of about 30 wt. percent and dried for about 2 hrs. at a maximum of 82° C. to reduce the volatile matter content (i.e. water) to about 0.5%.

It is readily evident that large space requirements and equipment costs are needed in these conventional drying operations. Additionally, in certain processes, the heating steps are either inadequate or detrimental.

For example, the shearing action and high temperature in the devolatilizing extruder, i.e. 375–500° F., results in polymers (e.g. PVC, butyl rubber) having molecular weight distributions skewed toward the low end. Consequently, it is only with great difficulty that, in preparing butyl rubber, can a polymer be prepared which has a number average molecular weight ($\overline{M}_n$) to weight average molecular weight ($\overline{M}_w$) greater than 4.0.

The halogenated butyl rubbers, especially brominated butyl rubber, for example, decompose at the drying temperatures used in the devolatilizer extruder. The result is the release of lacrimatory gases, e.g. HBr, and severe corrosion of equipment.

When polyisobutylene has been prepared and dried in a conventional manner, baled in the manner described in U.S. Patent 3,264,387 and stored for several weeks, the bales become relatively transparent. Occluded moisture becomes visible as a large white "baseball" in the center of the bale.

Though the polymer water content is only about 0.1 to about 0.8 wt. percent, and does not affect product quality, the appearance of the bale affects customer acceptance. It is desirable therefore to remove this remaining water to give a moisture-free product. Conventional drying techniques are inadequate to further reduce the water content of the polymer.

Various polymer processing techniques have been developed utilizing electronic heating. For example, metal particles have been dispersed in a vulcanizable rubber and the mix cured by induction heating at a frequency of about 1 mHz., e.g. see U.S. 3,249,658. As the name implies, induction heating operates by inducing a current in a conductor, i.e. metal filings; the heat effect depends on the eddy currents induced in the material and the heating of the rubber is by conduction from the metal filings.

Dielectric heating has been used to heat non-conductors having polar molecules. For example, polyvinyl chloride may be pressed into molding "pre-forms" and heated by dielectric heating prior to introduction into a compression mold. This heating technique relies on the polarity of the molecule to induce a heating effect. The material to be heated is placed between two plates which form a capacitance in an electronic circuit. The polarity of the plates is rapidly reversed at a frequency in the range of about 1 to about 150 mHz. Heating is caused by the rapid vibration of the polar molecules attempting to align themselves with the constantly changing field.

More recently the partial curing of natural rubber or synthetic elastomers has been accomplished by passing the material through the center of a helical metal waveguide which is connected to a microwave generator running at about 300 to about 30,000 mHz., e.g. British Patent 1,065,971. Curing is completed by passing the material through a conventional heater.

Microwave heating, like conventional dielectric heating, is based on the principle that electromagnetic waves interact with a dielectric material, some of the energy associated with these waves being stored and some being dissipated. The heating effect is a function of the dissipated energy (dielectric loss). The dielectric loss is caused by the frictional drag associated with permanent or induced dipole orientation in the alternating electric field. Generally, polymers shown an increase in dielectric loss with an increase in frequency of the radiation. Some polymers, however, e.g. PVC, actually show a decrease in dielectric loss at the higher frequencies.

Though all polymer molecules exhibit some polarity, with few exceptions, the synthetic elastomers are essentially nonpolar and hence, have a low dielectric loss. Heating of these materials is usually accomplished by the inclusion of polar materials such as fillers, i.e. carbon black.

SUMMARY OF INVENTION

It has been found that, surprisingly, the volatile matter content of essentially nonpolar polymers can be reduced to below the detectable limit of 1 p.p.m. by continuous drying in a two-step operation using microwave heating comprising a first drying step at 915 mHz. (L band) for about 10 seconds to 3 minutes to reduce the moisture content below 5 wt. percent and a second drying step of about 10 sec. to about 3 min. at 2450 mHz. (S band).

During the drying process, the wet polymer is carried through a resonating cavity on a conveyor belt, the polymer forming a bed on said belt of about 3 to about 7 inches in depth.

Surprising added advantages of this drying technique are that the polymers dried by the process of this invention have improved appearance, a broader molecular weight distribution (i.e. higher $\overline{M}n/Mw$) and a higher modulus of elasticity. Further, though the polymer is thoroughly dry, it leaves the second resonating cavity only warm to the touch and requires no further cooling before baling.

DESCRIPTION OF DRAWING

The present invention will be further illustrated by reference to the drawings in which.

DETAILED DESCRIPTION

Figure 1:
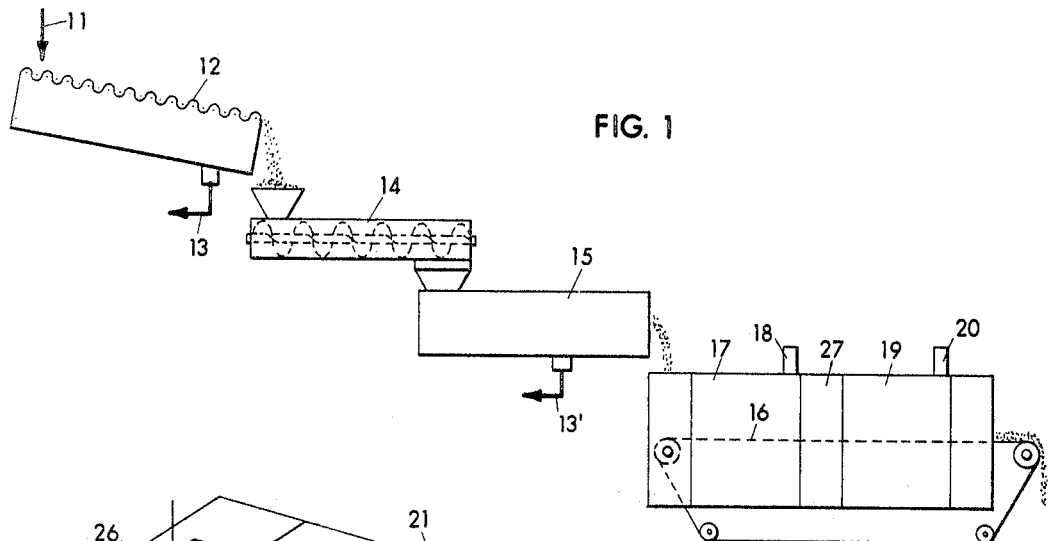
FIG. 1 is a flow diagram of a preferred method for carrying out the process of this invention.

The expression "butyl rubber" as employed in the specification and claims is intended to include copolymers made from a polymerization reactant mixture having therein about 70–99.5% by weight of an isoolefin which has about 4–7 carbon atoms and about 30–0.5% by weight of a conjugated multiolefin having about 4–14 carbon atoms. The resulting copolymer contains 85–99.5% of combined isoolefin and 0.5 to 15% of combined multiolefin. The term "butyl rubber" is described in an article by R. M. Thomas et al. in Industrial Engineering and Chemistry, vol. 32, pp. 1283 et seq., October 1940.

The butyl rubber generally has a Staudinger molecular weight between about 20,000 to about 500,000; preferably about 25,000 to about 200,000; especially 45,000 to 60,000; and a Wijs iodine number of about 0.5 to about 50; preferably 1 to 15. The preparation of butyl rubber is described in U.S. Patent 2,356,128, which is incorporated herein by reference.

The halogenated rubbery isoolefin-multiolefin-containing copolymers, particularly brominated butyl rubber, which are advantageously devolatilized and dried in accordance with the present invention, are produced by careful halogenation of the rubbery isoolefin-multiolefin copolymers in a manner which does not degrade the molecular weight thereof as more fully described hereinafter.

In order to produce halogenated butyl rubber, the halogenation is regulated so that the resulting rubber will contain about at least 0.5 wt. percent (preferably at least about 1.0 wt. percent combined halogen, but not more than about X wt. percent combined chlorine or 3.0 X wt. percent combined bromine wherein:

$$X = \frac{M_3 L}{(100-L)M_1 + L(M_2+M_3)}$$

and:

L = mole percent of the multiolefin in the polymer,
$M_1$ = molecular weight of the isoolefin,
$M_2$ = molecular weight of the multiolefin,
$M_3$ = atomic weight of chlorine or bromine.

Suitable halogenating agents which may be employed are gaseous chlorine, liquid bromine, alkali metal hypochlorites or hypobromites, $C_4$–$C_{10}$ tertiary alkyl hypochlorites, sulfur bromides, sulfuryl chlorides, pyridinium chloride perchloride, N-bromosuccinimide, alpha-chloroacetanilide, N,N'-dichloro-5,5-dimethyl hydantoin, iodine halides, trichlorophenolchloride, N-chloroacetamide, beta-bromo-methyl-phthalimide. Preferred halogenating agents are gaseous chlorine, liquid bromine, sulfuryl chloride, sulfuryl bromide, chlorohydantoins, bromo-hydantoins, iodine monochloride and related materials. The halogenation is generally conducted at temperatures above 0° to about +100° C., depending upon the particular halogenating agent, for about 1 minute to several hours. An advantageous pressure range is from about 0.1 to 1000 p.s.i.a., atmospheric pressure being satisfactory. The halogenation may be accomplished by preparing a 1 to 30 wt. percent solution of such polymers as above in a substantially inert liquid organic solvent such as $C_3$–$C_8$ substantially inert hydrocarbons or halogenated derivatives of saturated hydrocarbons, i.e. hexane, mineral spirits, cyclohexane, benzene, chlorobenzene, chloroform, carbon tetrachloride, mixtures thereof, etc. and adding thereto the halogenating agent which may optionally be dissolved in a substantially inert $C_3$–$C_{12}$ hydrocarbon, a $C_1$–$C_5$ alkyl chloride, carbon tetrachloride, carbon disulfide, etc. If chlorine gas is employed, it may also be diluted with up to about 50, preferably 0.1 to 5, times its volume of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the halogenated butyl rubber and dried at about 1 to 760 millimeters or higher of mercury pressure absolute, at about 0° to 180° C., preferably at about 50° to 150° C., e.g. 70° C. Other methods of recovering the chlorinated polymer are by conventional spray or drum drying techniques.

Alternately, the solution of the halogenated rubber may be injected into a vessel containing steam and/or agitated water heated to a temperature sufficient to volatilize the solvent and form an aqueous slurry of the rubber. This halogenated rubber may be separated from the slurry by filtration and recovered as a crumb. As so produced, the halogenated rubbery polymer has a Staudinger molecular weight within the range of approximately 20,000 to 500,000, preferably 25,000 to 200,000.

The term "polyisobutylene" as used in this specification is intended to mean homopolymers of isobutylene having a Staudinger molecular weight of about 60,000 to about 140,000. The particular polymerization techniques by which the polymer is made does not form an essential part of this invention.

Though GR-S type (styrene-butadiene) latex is referred to in particular, it is obvious the drying technique of this invention is applicable to any latex polymerization process. The term "latex polymerization" as used in this specification includes any process in which monomers are emulsified into or suspended in a water medium during the polymerization process. The term "latex" as used in this specification includes all polymers formed by latex polymerization techniques.

The term "microwave heating" as used throughout this specification means heating with electromagnetic radiation at about 900 to about 30,000 mHz. Preferably, the microwave heating frequency is about 900 to about 8600 mHz.; more preferably about 915 to about 2450 mHz.

Though application of this invention is directed primarily toward particular synthetic elastomers, it is evident that the invention disclosed herein is suitable for use in any process for making of essentially non-polar polymer which requires a drying step to remove volatile polar solvents or water. The term "polymer" includes elastomers, plastimers, and thermoplastics. The term "essentially non-polar" includes those materials having a dielectric loss factor of about 0.0001 to about 0.1, e.g. butyl, halogenated butyl, GR-S polymers polyvinyl chloride.

Both meandering wave guides and resonating cavities may be used as means for exposing the material to be treated to microwave radiation. The meandering wave guide system has the disadvantage of requiring a relatively shallow bed depth. For example, in drying butyl rubber using a meandering wave guide system the depth of the butyl rubber on the conveyor belt is limited to a maximum of three inches at 915 mHz. and a maximum of ½ inch at 2450 mHz. This limitation is caused by the nature of the propagation of the electromagnetic radiation and the necessity for confining it within a hollow wave guide.

In order to best utilize the electromagnetic radiation for heating, it is necessary to pass the material to be heated through the center of the meandering wave guide since at the top and bottom of the wave guide the electric field is at its maximum while at its sides it is at its minimum. A shallow bed depth requires a relatively narrow opening in the wave guide; hence, there is no danger of radiation leakage out of the wave guide. As the bed depth increases, the height of the opening increases up into the zone of high field intensity allowing radiation leakage and resulting in lower overall heating efficiency.

The preferred process utilizes a resonating cavity since, in that case, for example in the drying of butyl rubber, the depth of the rubber on the conveyor belt can be about 5 to about 10 inches; preferably about 6 to about 8 inches; e.g. 7 inches at 915 mHz. and about 1 to about 3 inches, preferably about 1½ to about 2½, e.g. 2 inches at 2450 mHz.

Referring now to the drawing and particularly to FIG. 1, numeral 11 designates a discharge line from the slurry tanks of a butyl rubber operation by way of which the aqueous slurry is transferred to a vibrating screen 12. The bulk of the water is separated from the butyl rubber crumb, the water being discharged by water discharge line 13 and the crumb containing about 60% water is transferred by means of a screw conveyor 14 to an Anderson Expeller, 15, which reduces the water content to about 6 to about 30 wt. percent; usually about 10 to about 20 wt. percent, the water being discharged through water discharge line, 13'. The crumb, reduced in water content, is discharged onto a conveyor belt 16 and carried into the first resonating cavity 17 which has introduced into it, by means of a wave guide 18, electromagnetic radiation at 915 mHz. The water content is reduced to about 5 wt. percent. Thereafter, the material passes into the second resonating cavity 19 which has introduced into it, by means of a wave guide 20, electromagnetic radiation at 2450 mHz. The butyl rubber crumb is discharged from the second resonating cavity 19 with a water content less than 10 parts per million (p.p.m.), e.g. less than 1 p.p.m.

The resonating cavities 17 and 19 may be two separate microwave ovens each equipped with inlet and outlet absorption barriers or it may be a single unit with the two cavities separated by a metal barrier wall and appropriate microwave isolators 27 (e.g. 5–25 inch water filled space).

Figure 2:
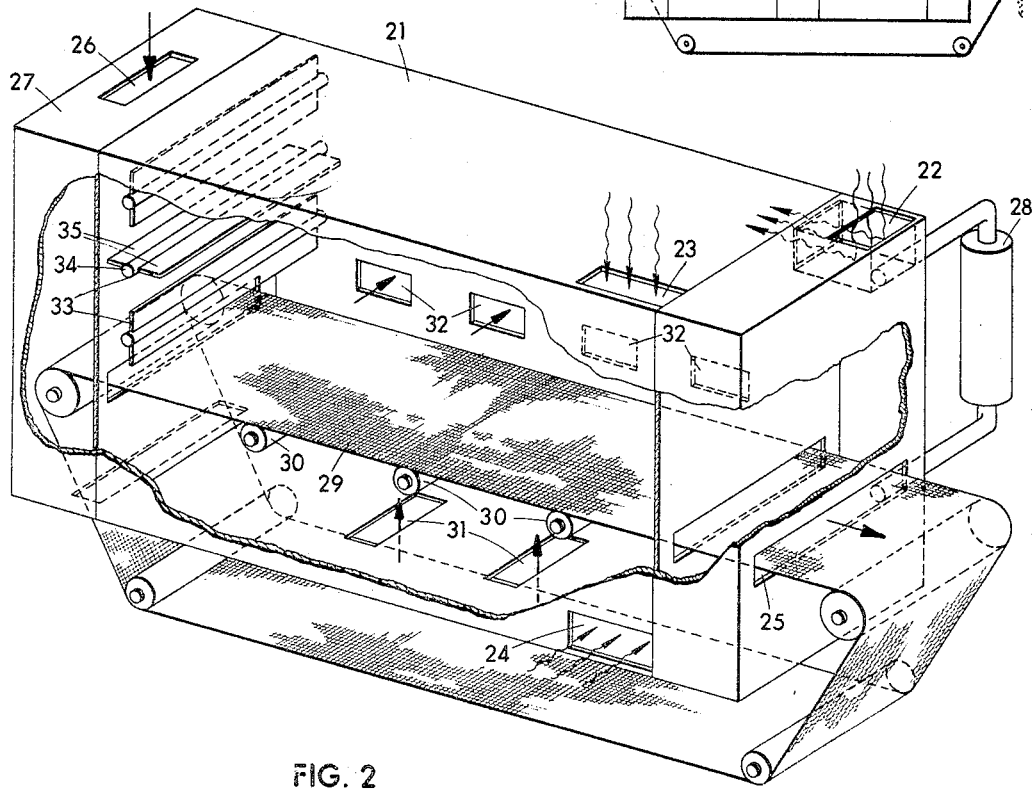
FIG. 2 is an isometric detail of a resonating cavity (microwave oven).

The structure of the resonating cavity may be more clearly understood by referring to the drawing, in particular FIG. 2, wherein numeral 21, designates an enclosure (the resonating cavity) constructed of electrically conductive material (e.g. metal). The enclosure is about 5 to about 10 feet long, about 1 to about 4 feet high and about 2 to about 4½ feet wide; the dimensions are dependent on the amount of material to be treated, the contemplated power input and the desired residence time. The inlets for the microwave radiation 22, 23 and 24, are preferably located in the corners of one end of the enclosure 21 and directed at right angles to one another. At least one of the inlets 22 is directed countercurrent to the flow of material in the cavity.

At each end of the enclosure is an opening; an outlet 25 and an inlet 26. Radiation of microwave out of these openings is suppressed by means of filters consisting of reactants, the design of which is well known to the art or by an absorbing barrier 27 such as water or ethylene glycol. The absorption medium is cooled by circulation through an external heat exchanger 28.

The conveyor belt 29 is supported within the enclosure 21 by equally spaced rollers 30 made of non-conducting material such as Teflon or ceramics.

To prevent condensation within the enclosure, warm air is blown across the material to be dried. The air inlets 31 and outlets 32 being so located as to best utilize the air flow. For example, in the drying of butyl rubber the conveyor belt 29 is a screen. The air inlets 31 are located below the screen and the outlets 32 in the side of the enclosure, necessary baffles being provided to prevent short cutting of the flow. The air flow is up through the bed of butyl rubber and out through the outlets. For powdery material such as latices, the flow is across the surface from one side of the belt to the other.

The microwave radiation inlets are coupled to a microwave generator in the conventional manner through wave guides. In order to insure uniform distribution of radiation throughout the cavity, mode stirrers 33 are located at the end of the enclosure opposite the radiation inlets. The stirrers generally consist of a rotatably mounted bar 34 and two diametrically opposed paddles 35 extending the length of the bar. In operation, the stirrers are 90° out of phase with one another (i.e. in their rest position the blades of adjacent stirrers are at right angles to one another). About 1 to about 10 such stirrers are used; preferably about 3 to about 5 stirrers.

The following examples serve to illustrate the manner in which the process of this invention may be carried out as well as the benefits derived therefrom.

Example 1

Drying of butyl rubber having an average moisture content of 20 wt. percent.

Equipment:

(1) A resonating cavity operating at 915 mHz. (L-band)

Cavity dimensions: width—4 ft.; height—3 ft.; length—30 ft.
Conveyor belt width: 3 ft.
Power (microwave): 450 kw.
Air flow rate: 1500 c.f.m. at 170° F.

(2) Two resonating cavities each operating at 2450 mHz. (S-band)

Cavity dimensions: width—4 ft.; height—3 ft.; length—15 ft.
Conveyor belt width: 3 ft.
Power (microwave): 90 kw. per cavity
Air flow rate: 1300 c.f.m. at 150° F.

Butyl rubber crumb leaving the Anderson Expeller of a butyl rubber plant, having a water content of about 20 wt. percent, was fed on to the conveyor belt of the L-band cavity at a rate of about 6350 #/hr. (wet). The crumb bed height was about 6 inches. After a residence time of about 90 seconds (controlled by belt speed), the crumb exited from the L-band cavity with a water content of about 5 to about 7 wt. percent.

This partially dried product was split into two streams and fed into the S-band cavities. The depth of the bed in these units was about 1½ inches. After about a 12½ second residence time within the cavity, the rubber emerged with a water content of less than 10 p.p.m. and a snow white appearance. Production rate was about 5000 #/hr. of dry polymer.

Example 2

One of the S-band cavities of Example 1 was operated at 120 kw. microwave power and used to dry about 4000 #/hr. of wet polyisobutylene.

(A) Polyisobutylene having a water content of about 5 wt. percent was dried to a water content of less than 1 p.p.m. after a residence time in the cavity of about 25 seconds.

(B) Polyisobutylene having a water content of about 2 wt. percent was dried to a water content of less than 1 p.p.m. after a residence time in the cavity of about 10 seconds.

When the polyisobutylene of this example is baled, the bale remains clear and there is no observable indication of occluded water, i.e. white "baseballs."

Example 3

Polyvinyl chloride containing about 18 wt. percent water was dried in an S-band (2450 mHz.) cavity utilizing 60 kw. microwave power. The conveyor belt width was 12 inches, the air inlet temperature was 145° F. and the air flow rate was about 1300 c.f.m. The product bed height on the conveyor was about 2 inches while the residence time was about 25 seconds.

The product produced at 50 #/hr. had a final water content of less than 1 p.p.m. Its appearance was snow white in color and hence, would produce a film of greater clarity than the usual off-white product.

A determination of the molecular weight (vapor phase osmometry) was made and found to be 10,000 as compared to 8,000 for the conventionally dried powder.

Though in actual practice such large quantities of water (i.e. >5 wt. percent) would be removed using both an L-band and S-band cavity in series, this laboratory experiment serves to demonstrate that, surprisingly, drying by microwave heating results in a product having improved appearance and higher molecular weight.

Example 4

In a polypropylene process the polymer, containing about 25 wt. percent atactic polypropylene and about 13 wt. percent water, was dried in the laboratory unit of Example 3. After a residence time of about 16 seconds, the product (50 #/hr.) had a snow white appearance and a water content of less than 1 p.p.m.

Example 5

Butyl rubber crumb having a water content of about 5% was dried in one of the S-band cavities of Example 1 operating at 90 kw. microwave power. The crumb bed height was about 1½ inches while the air flow rate was 1400 c.f.m. at a temperature of about 145° F. A residence time of about 30 seconds reduced the water content to less than 1 p.p.m. The product (4000 #/hr. dry weight) was snow white in the form of crumbs and when baled was clear rather than off-white or amber as is the conventionally dried material.

The product had a broader molecular weight distribution (i.e. $\overline{M}_n/M_w=6$ vs. 4 for conventionally dried rubber). The broader molecular weight range makes for a more easily processed rubber.

The above example serves to illustrate that the drying of butyl rubber by microwave heating techniques results not only in greatly reduced drying time as anticipated, but, surprisingly, produces a product having improved appearance and broader molecular weight distribution.

Although the drying technique of this invention makes it possible, where necessary, to reduce the volatiles content of a polymer to below the detectable limit, e.g. <1 p.p.m., those skilled in the art are aware that in many cases it is sufficient to reduce the volatiles content, e.g. water, of synthetic polymers to less than 5000 p.p.m., more preferably about 3000 p.p.m. The advantages of this invention are still obtained where drying is suspended at these higher levels of volatiles content, e.g. 3000 p.p.m.

For example, the polymer bulk temperature under these conditions is only about 180–190° F. as compared to about 375–500° F. when conventional techniques are used for drying to these levels. As has been pointed out, the advantages obtained as a result of the lower temperatures are improved appearance, e.g. snow white rather than off-white or amber color, and broader molecular weight distribution. Additionally, the polymers exhibit higher tensile strengths and modulus of elasticity.

Though the process has been described in terms of removing water, it is evident that it is applicable to any polymer process which requires the removal of a vehicle so long as the vehicle (water or organic solvent) is polar. The wet polymer need only be delivered as a powder, crumb or pellet to the microwave oven. The term "polar vehicle" as used in this specification and claims means water or a polar organic solvent, i.e. organic solvents with a dielectric constant greater than 4.0.

Since many different embodiments of this invention may be made without departing from the spirit and scope thereof, it is to be understood that the present invention is not limited to the embodiments specifically disclosed in this specification thereof.

What is claimed is:

1. In a process for preparing an essentially nonpolar synthetic polymer utilizing a polar vehicle from which said synthetic polymer is separated, the improvement which comprises:
   (a) transferring the synthetic polymer containing the polar vehicle to a conveying means; and
   (b) passing said polymer by means of said conveying means through at least one microwave resonating cavity operating at a microwave frequency of about 900 to about 30,000 mHz. for a period of time sufficient to reduce the polar vehicle content of said polymer to less than 5,000 p.p.m.

2. The process of claim 1 wherein said polymer is passed through said resonating cavity for a time sufficient to reduce the polar vehicle content of said polymer to less than 10 p.p.m.

3. The process of claim 1 wherein the synthetic polymer has an initial polar vehicle content of about 6 to about 30 wt. percent.

4. The process of claim 1 wherein the synthetic polymer is GR–S rubber, butyl rubber, halogenated butyl rubber, polyvinyl chloride, polypropylene or polyisobutylene.

5. In a process for preparing an essentially nonpolar synthetic polymer utilizing a polar vehicle from which said synthetic polymer is separated, the improvement which comprises:
   (a) transferring the synthetic polymer, containing about 6 to about 30 wt. percent polar vehicle, to a conveying means;
   (b) passing said polymer by means of said conveying means through a first microwave resonating cavity operating at a microwave frequency of 915 mHz, for a period of time sufficient to reduce the vehicle content of said polymer to less than 5 wt. percent; and
   (c) passing said polymer by means of a second conveying means through a second microwave resonating cavity operating at a microwave frequency of 2450 mHz. for a period of time sufficient to reduce said vehicle content to less than 5,000 p.p.m.

6. The process of claim 5 wherein the synthetic polymer is GR-S rubber, butyl rubber, halogenated butyl rubber, polyvinyl chloride, polypropylene or polyisobutylene.

7. The process of claim 5 wherein said polymer is passed through said resonating cavity for a time sufficient to reduce the polar vehicle content of said polymer to less than 10 p.p.m.

8. In a process for preparing butyl rubber wherein a slurry of said rubber is formed in a diluent from which said rubber is separated by introducing said slurry into water, thereby forming a water slurry of butyl rubber crumb, the steps which comprise:
 (a) separating said rubber crumb from the water;
 (b) reducing the water content of said crumb, by mechanically dewatering, to about 6 to about 30 wt. percent;
 (c) transferring said rubber crumb to a conveying means;
 (d) passing said rubber crumb by means of said conveying means through a first microwave resonating cavity operating at a microwave frequency of 915 mHz. for a period of time sufficient to reduce the water content of said rubber crumb to below 5 wt. percent; and
 (e) passing said rubber crumb through a second microwave resonating cavity, operating at a microwave frequency of 2450 mHz., for a period of time sufficient to reduce the water content below 10 p.p.m.

9. The process of claim 8 wherein the rubber is halogenated butyl rubber.

10. A process for drying polyisobutylene polymer so that it is substantially free of occluded water which comprises passing particles of polyisobutylene having an initial moisture content of less than 5 wt. percent through a microwave resonating cavity at a frequency of 2450 mHz., for a time sufficient to reduce the moisture content to less than 1 p.p.m.

11. The process of claim 10 wherein the initial polymer moisture content is about 0.1 to about 0.8 wt. percent.

12. A process for preparing bales of polyisobutylene which are substantially transparent and exhibit no occluded water which comprises baling the product of claim 10 by compressing said polymer at a temperature of about 140° to about 250° F. and a pressure of about 800 to about 3500 p.s.i. for about 5 to about 60 seconds.

13. The process of claim 1 wherein said polar vehicle is water.

14. The process of claim 5 wherein said polar vehicle is water.

References Cited

UNITED STATES PATENTS

| | | | |
|---|---|---|---|
| 3,145,088 | 8/1964 | McKay | 34—4 |
| 3,277,580 | 10/1966 | Tooby | 34—1 |

KENNETH W. SPRAGUE, *Primary Examiner.*